US008255877B2

(12) United States Patent
Vong et al.

(10) Patent No.: US 8,255,877 B2
(45) Date of Patent: Aug. 28, 2012

(54) METHOD FOR MANAGING THE TRIGGERING OF AN APPLICATION IN A SERVICE TERMINAL, PARTICULARLY IN A TELECOMMUNICATION TERMINAL

(75) Inventors: Robert Vong, Singapore (SG); Abraham Yap-Jr, San Mateo (PH)

(73) Assignee: Gemalto SA, Meudon (FR)

( * ) Notice: Subject to any disclaimer, the term of this patent is extended or adjusted under 35 U.S.C. 154(b) by 1149 days.

(21) Appl. No.: 10/545,436

(22) PCT Filed: Feb. 27, 2004

(86) PCT No.: PCT/EP2004/050223
§ 371 (c)(1),
(2), (4) Date: Nov. 9, 2007

(87) PCT Pub. No.: WO2004/079478
PCT Pub. Date: Sep. 16, 2004

(65) Prior Publication Data
US 2010/0273521 A1 Oct. 28, 2010

(30) Foreign Application Priority Data
Mar. 6, 2003 (FR) ...................................... 03 02736

(51) Int. Cl.
*G06F 9/44* (2006.01)
*G06F 15/177* (2006.01)
*H04W 4/00* (2009.01)

(52) U.S. Cl. ......... 717/126; 717/121; 455/466; 709/221

(58) Field of Classification Search .................. 717/121, 717/126
See application file for complete search history.

(56) References Cited

U.S. PATENT DOCUMENTS

| | | | | |
|---|---|---|---|---|
| 5,568,153 | A | * 10/1996 | Beliveau | 342/357.43 |
| 6,078,820 | A | * 6/2000 | Wells et al. | 455/466 |
| 6,125,281 | A | 9/2000 | Wells et al. | |
| 6,370,151 | B1 | * 4/2002 | Bojanic | 370/426 |
| 7,079,526 | B1 | * 7/2006 | Wipliez et al. | 370/352 |

(Continued)

FOREIGN PATENT DOCUMENTS
WO     00/69183     11/2000
(Continued)

OTHER PUBLICATIONS
Mandato et al., "CAMP: A Context-Aware Mobile Porta", 2000 @ IEEE, retrieved from <http://ieeexplore.ieee.org/stamp/stamp.jsp?tp=&arnumber=934161>, pp. 52-61.*

*Primary Examiner* — Don Wong
*Assistant Examiner* — Marina Lee
(74) *Attorney, Agent, or Firm* — Buchanan Ingersoll & Rooney PC

(57) ABSTRACT

The disclosure relates to a method for managing the triggering of an application in a terminal place in an environment consisting of several access technologies. The disclosure also relates to a mobile telephone type terminal that implements the method. A test mechanism is implemented for at least one application on the basis of information contained in the tested application when a triggering event occurs for an application, thereby making it possible to recognize or deduce the network access technologies supported by the application.

25 Claims, 2 Drawing Sheets

U.S. PATENT DOCUMENTS

| | | | | |
|---|---|---|---|---|
| 7,123,933 B2 * | 10/2006 | Poor et al. | | 455/552.1 |
| 7,318,111 B2 * | 1/2008 | Zhao | | 709/250 |
| 7,363,354 B2 * | 4/2008 | Lahti | | 709/219 |
| 7,372,841 B2 * | 5/2008 | Hammell et al. | | 370/342 |
| 7,761,117 B2 * | 7/2010 | Park | | 455/566 |
| 8,068,446 B2 * | 11/2011 | Noh et al. | | 370/311 |
| 2002/0177413 A1 * | 11/2002 | Jouppi et al. | | 455/67.1 |
| 2002/0183051 A1 * | 12/2002 | Poor et al. | | 455/418 |
| 2003/0083078 A1 * | 5/2003 | Allison et al. | | 455/466 |
| 2003/0101246 A1 * | 5/2003 | Lahti | | 709/221 |
| 2004/0092248 A1 * | 5/2004 | Kelkar et al. | | 455/411 |
| 2004/0219935 A1 * | 11/2004 | McCann et al. | | 455/466 |
| 2005/0032555 A1 * | 2/2005 | Jami et al. | | 455/574 |
| 2005/0059397 A1 * | 3/2005 | Zhao | | 455/435.2 |
| 2005/0176445 A1 * | 8/2005 | Qu et al. | | 455/458 |
| 2008/0153469 A1 * | 6/2008 | Park et al. | | 455/414.3 |
| 2010/0273521 A1 * | 10/2010 | Vong et al. | | 455/550.1 |
| 2010/0325167 A1 * | 12/2010 | Landry | | 707/802 |

FOREIGN PATENT DOCUMENTS

WO   02/32171 A1   4/2002

* cited by examiner

METHOD FOR MANAGING THE TRIGGERING OF AN APPLICATION IN A SERVICE TERMINAL, PARTICULARLY IN A TELECOMMUNICATION TERMINAL

The disclosure is based upon French Application No. 0302736, filed Mar. 6, 2003, and PCT Application No. PCT/EP2004/050233, filed Feb. 27, 2004, the contents of which are incorporated herein by reference.

BACKGROUND OF THE INVENTION

The invention concerns a method of managing the triggering of an application in a service terminal and in particular a telecommunication terminal such as a mobile telephone.

The invention applies to any terminal and to chip cards able to trigger an application or to execute an application on the arrival of a triggering event. The invention also applies to applications comprising triggering rules as a function of the arrival of at least one predefined event.

In the context of a telecommunication terminal of the mobile telephone type, the arrival of an event triggering an application means for example the arrival of a short message (SMS) or the start of a call made on the mobile telephone by the user.

The invention applies since applications, for historical reasons, are related to triggering events so that their triggering is related to the arrival of a triggering event, when the terminal must be capable of functioning with different network environments, in other words in a multi-technology network access context.

This is because there exists today, in particular in telecommunications, competition between several technologies supported by the various operators.

In a practical fashion each telephone network operator offers one or more network access technologies and application programs, hereinafter referred to as applications, compatible with the network access technology of the operator, namely GSM, UMTS, CDMA, IDEN, ANSI-136, etc.

Solutions are sought today affording multi-technology accesses, that is to say solutions which make it possible for a service terminal and in particular a mobile telephone defined according to specific standards and technologies to be able to function in a multi-technology context.

SUMMARY OF THE INVENTION

The present invention is situated precisely in the context of multi-technology network access.

The present invention in fact enables a mobile telephone defined according to specific standards and technologies to function in a multi-technology network access context. More precisely, with the solution proposed by the present invention, an application defined for example according to the GSM standard and incompatible with UMTS access will not cause a malfunction of the telephone by being triggered.

One object of the invention is more particularly a method of managing the triggering of an application in a terminal placed in an environment composed of several access technologies, characterised in that it comprises:

on the arrival of an event triggering an application,
the implementation of a mechanism for testing the application from information contained in the application tested, making it possible to know or deduce the network access technology or technologies supported by the application.

According to one embodiment, the test mechanism is in the operating system of the terminal and its implementation comprises:

the verification by the terminal:
of information concerning the current network access technology or technologies,
information contained in the application enabling it to know or deduce the technology or technologies supported by the application,
the triggering of the application solely in the case where this information is compatible.

According to another embodiment, the test mechanism is in the application and its implementation comprises:
the verification by the terminal:
of information concerning the current network access technology or technologies,
of information contained in the application enabling it to know or deduce the technology or technologies supported by the application,
the continuation of the execution of the application solely in the case where this information is compatible.

According to another characteristic, the information contained in the application comprises triggering parameters from various operating modes of the application declared, making it possible to determine the abilities of the application, that is to say the network access technology or technologies supported by the application.

Advantageously, the mechanism comprises four operating modes, one of which is based on characteristics of the application, another on the identification of the application and the third on attributes of the application, a fourth mode is taken by default when none of the other three modes is declared.

Several operating modes can be declared for one and the same application.

The default mode corresponds to the case where the application is indifferent to the network access technology.

According to another characteristic, the mechanism uses commands designed to enable it to install a new application containing the information making it possible to know or deduce the technology or technologies supported by the said application or to update this information or to read this information.

Another object of the present invention concerns a service terminal comprising program storage means for storing a program corresponding to the operating system and one or more applications, principally characterised in that it also comprises means of implementing a method of testing at least one application from information contained in the application tested, this information enabling the operating system to know or deduce the network access technology or technologies supported by the application tested and to verify its compatibility with the current network access used by the terminal.

According to a particular application, the terminal is a telecommunication terminal of the mobile telephone type equipped with a chip card and is able to function with a multi-technology network access environment. The application or applications tested and the test mechanism are placed in the chip card of the terminal.

Another object of the invention concerns a telecommunication terminal chip card principally characterised in that it comprises means of implementing a mechanism for testing at least one application which, from information contained in the application tested, enables the operating system of the card to know or deduce the network access technology or technologies supported by the application tested and to verify its compatibility with the current network access used by the terminal.

The test mechanism is a program loaded in a non-volatile program memory of the card, called up by the operating system of the chip card or integrated in the said system.

Another object of the invention also concerns any application able to be executed by a service terminal or a chip card equipping this terminal placed in an environment composed of several network access technologies provided that it comprises triggering rules according to the arrival of at least one predefined event and provided that it also comprises information enabling it to know or deduce the network access technologies that it supports.

According to one embodiment, the application can also comprise a test mechanism which will enable it, from information that it contains, to know or deduce itself the network access technology or technologies supported.

BRIEF DESCRIPTION OF THE DRAWINGS

Other particularities and advantages of the invention will emerge clearly from a reading of the description given below by way of non-limiting example and with regard to the accompanying drawings, in which.

DETAILED DESCRIPTION

The following description concerns more particularly the application of the invention to a telecommunication terminal such as a mobile telephone. In such an application, the applications tested and the test mechanism are in the chip card associated with the mobile telephone.

For this, according to the method, provision is made for any application installed in a mobile telephone chip card to comprise information which enables the chip card to know directly from this information or to deduce from this information which is or are the access technology or technologies supported by the application.

In the example which will be described, provision is made for the information to be in the form of a data item comprising several bytes, one byte of which makes it possible to parameterise the operating mode or modes of the application. Thus the operating system of the card can, knowing the operating mode or modes of the application, know or deduce the abilities of the application to support one or other of the existing access technologies.

One or more other bytes make it possible to declare the existing technologies able to be supported by the application and one or more other bytes are provided for defining future technologies able to be supported by this application.

By going to read the information contained in a reserved field of the application, the card is given information on the possibilities of this application and will be able, with the mechanism provided, which can be integrated in its operating system, take the decision to activate an application or not.

The card will or will not take the decision to trigger the application if the current technology (the technology used by the card) is compatible with the information contained in the application.

Figure 1:
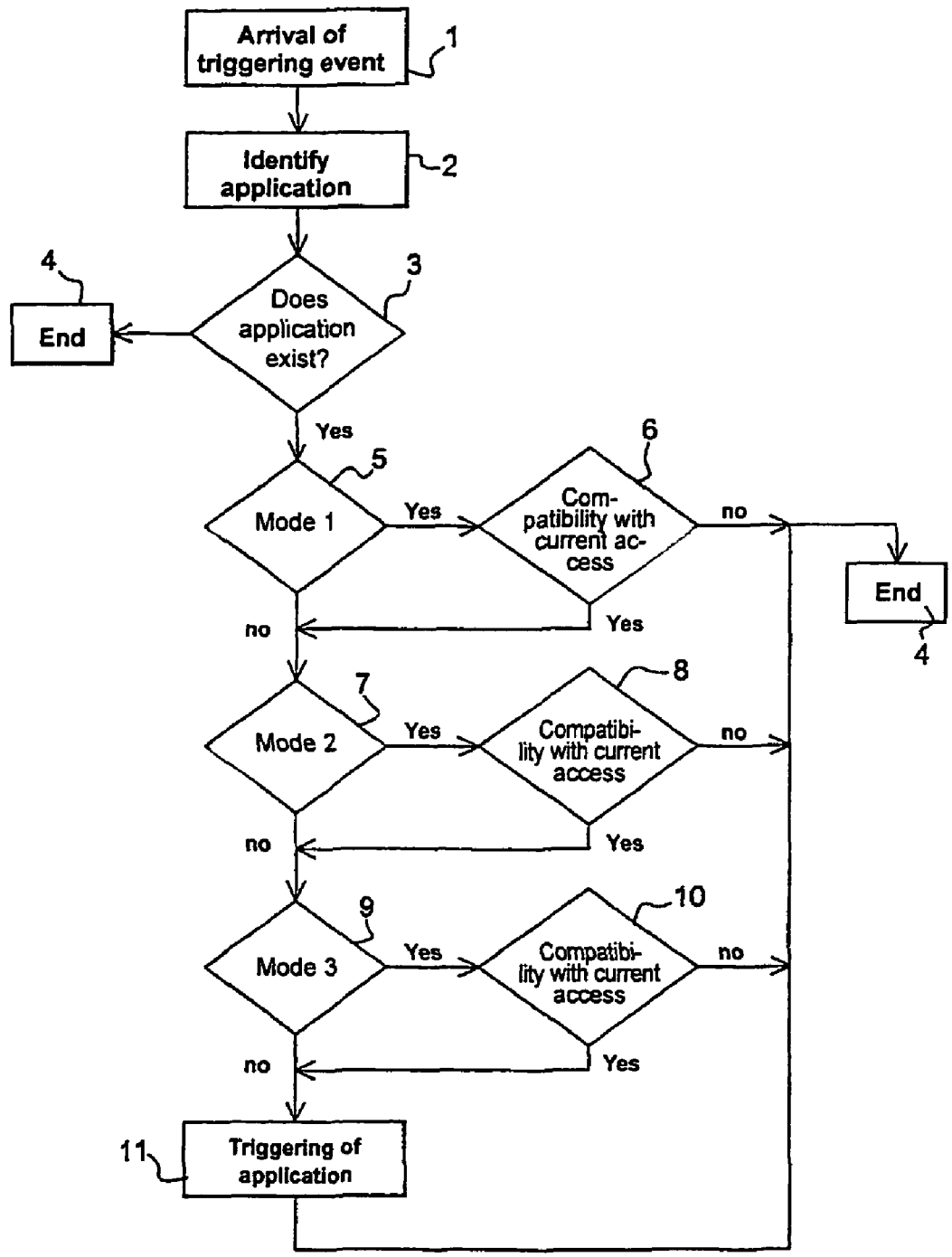
FIG. 1 depicts a functional diagram of a mechanism for implementing the method according to the invention.

For this, the operating system of the card and more precisely the « toolkit framework » part dedicated to the processing of the « toolkit » commands will implement the test mechanism illustrated by the diagram in FIG. 1, when an event triggering an application arrives.

In order to know the current technology, there exist three possible solutions, namely:
- a « terminal profile » command, which describes the capabilities of the mobile telephone,
- a « provide local information » command sent by the card to the mobile telephone and then to the network,
- the operating system of the card possesses the information implicitly. It is in this case capable of implementing a processor that the card receives the information from the network.

In the example given, the card deduces the network access technology supported by an application from the triggering parameters contained in the application, these parameters making it possible to declare from one to three operating modes for an application, and a fourth mode being taken by default when none of the other three is declared. The test comprises in the example a succession of tests for the three modes declared, each mode taken individually not necessarily making it possible to give a complete response on the technology supported by the application. The declared modes are as follows:

Mode «0»:

This is the mode that is taken by default by the operating system of the card when no mode is declared in the application. No mode is declared when the fields recording the mode parameters are empty. Mode «0» means that the application is independent of the network access technologies and that it can be activated under any one of the network technologies.

Mode «1»:

This mode is used when the mode «1» parameter is declared in the field of the application provided. This mode signifies that the operating system is capable of deducing the abilities of the application from the heritage hierarchy, the derived classes and the implemented interfaces.

It is a case typically of a Java application. In the case of a Java application, the application is extended from classes or implements a given interface. The Java execution environment is capable of knowing which are these classes and the interface and thus knowing which are the abilities inherited by the application since the classes and the interface involved are normally standard and known.

By virtue of this it is possible for the card (the operating system) to determine whether or not the application supports a particular access technology.

Mode «2»:

This mode is used when the parameter of mode «2» is declared in the field of the application provided. This parameter indicates that the operating system is capable of deducing the abilities of the application by means of its identification (name) or other elements that enable it to be recognised.

The application possesses an identification code (application identifier: AID), in general from 1 to 16 bytes, which makes it possible to identify it uniquely on a card.

This identification code (or name) can contain information on its presentation (package), the classes or associations. From this information it is possible for the operating system to deduce the abilities of the application to support or not one or other of the network access technologies.

Mode «3»:

This mode is used when the parameter «3» is declared in the field of the application provided.

This mode signifies that the operating system of the card is capable of deducing the abilities of the application from attributes that it contains or that are associated with it. Some attributes can be hard coded in the classes, assigned during an extantiation or associated with the application during its installation. From these elements the operating system can deduce the abilities of the application to support a network access technology or not.

Thus, for example, when an application is installed, certain installation parameters are supplied in order to identify the access technologies that the application can support, these parameters are stored on the card and associated with the application.

When a triggering event occurs, the operating system of the card recovers the parameters and determines whether or not the application can support the access technology of the card (the current access). If the technology supported by the application is compatible with the current technology of the card then the card triggers the application, otherwise the card does not trigger the application.

The following tables are given by way of example. They depict an illustration of the information contained in an application to make it possible, as has been seen, to know or deduce the network access technology or technologies supported by the application.

This information is in the example in the form of 4 bytes as detailed below:

Byte 1:

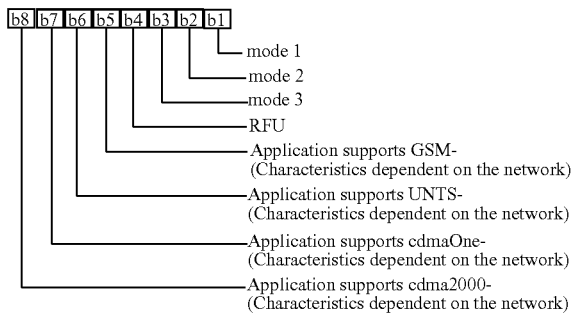

Byte 2:

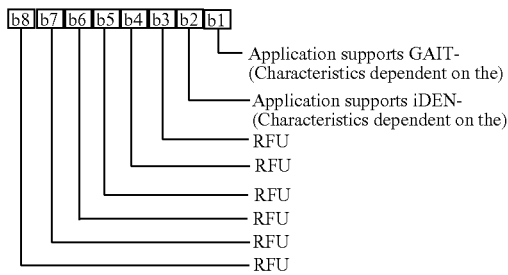

Byte 3:

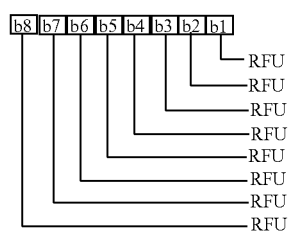

Byte 4:

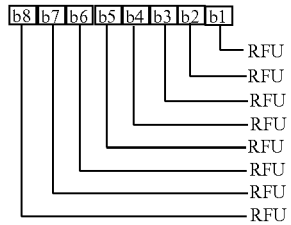

The following table illustrates an example of information declared in an application and its meaning. The data are in hexadecimal.

| Selective mode activation | | | | |
|---|---|---|---|---|
| Byte 1 | Byte 2 | Byte 3 | Byte 4 | Description |
| '01h' | 'XXh' | 'XXh' | 'XXh' | The application uses mode 1, these abilities can be derived from these heritages. |
| '02h' | 'XXh' | 'XXh' | 'XXh' | The application uses mode 2, these abilities can be deduced from its identification. |
| '14h' | 'OOh' | 'OOh' | 'OOh' | The application uses mode 3 for indicating that it supports only GSM access. |
| '34h' | 'OOh' | 'OOh' | 'OOh' | The application uses mode 3 to indicate that it supports GSM and UMTS access. |
| '85h' | 'OOh' | 'OOh' | 'OOh' | The application uses mode 3 for indicating that it supports CDMA 2000, and mode 1 is used at the same time to indicate its abilities in this context. |

A description will now be given of the method implemented by the mechanism illustrated by the functional diagram in FIG. 7. The steps therein are referenced from 1 to 11.

On the arrival of an activation event 1, the operating system identifies the application concerned 2 and checks whether this application is in the card 3. If the application is not in the card the mechanism ends 4.

When the application is in the card, the operating system checks whether mode «1» is declared 5.

If this mode is declared, the operating system deduces which is the network access supported by the application and whether this access is compatible with the current access 6. If there is incompatibility, the mechanism ends and awaits a new activation event for an application.

Where there is compatibility 6 or where mode «1» is not declared, the operating system checks whether mode «2» is declared 7.

If such is the case, the operating system deduces which is the network access supported by the application and whether this access is compatible with the current access 8.

If there is incompatibility, the mechanism ends and awaits a new activation event for an application.

Where there is compatibility 8 or where mode «2» is not declared, the operating system checks whether mode «3» is declared 9.

If this mode is declared, the operating system deduces which is the network access supported by the application and whether this access is compatible with the current access 10. If there is incompatibility, the mechanism ends and awaits a new activation event for an application.

Where there is compatibility 10 or where mode «3» is not declared, the operating system activates the application 11. This is because, as seen previously, if none of the modes is declared, this means that the application is independent of the network access technology, the default mode «0» is applied.

The use of several commands is also provided with this mechanism.

A first command makes it possible to install a new application on a card. This command comprises all the parameters that have just been described and is sent with the new application to be loaded in the card. This command is called «INSTALL» and its status structure is given in Appendix 1 of the description.

This command «INSTALL» is therefore sent to the card with the application over a radio link in the form of an SMS message for example.

In the example given the command comprises five header bytes that specify the nature of the said command and 0 to 255 data bytes. The data structure illustrated in the appendix shows that the first data byte specifies the length of the AID application (application identifier) of the load file and the following X bytes specify the value of this AID, the byte X+2 specifies the length of the AID of the application class, the following bytes the value of this AID, etc.

A second command is provided, it is a case of the command «PUT DATA». This command enables the operating system of the card to be able to perform an update of the parameters for triggering an application after its installation. This command is detailed in Appendix 2 of the description.

A third command is provided, it is a case of the command «GET DATA». This command makes it possible to read the application triggering parameters. This command is detailed in the appendix of the description.

A fourth command may be provided, it is a case of the command «GET STATUS» to make it possible to find the triggering parameters of an application. An example of a response in return to this command is illustrated in the appendix to this description.

Figure 2:
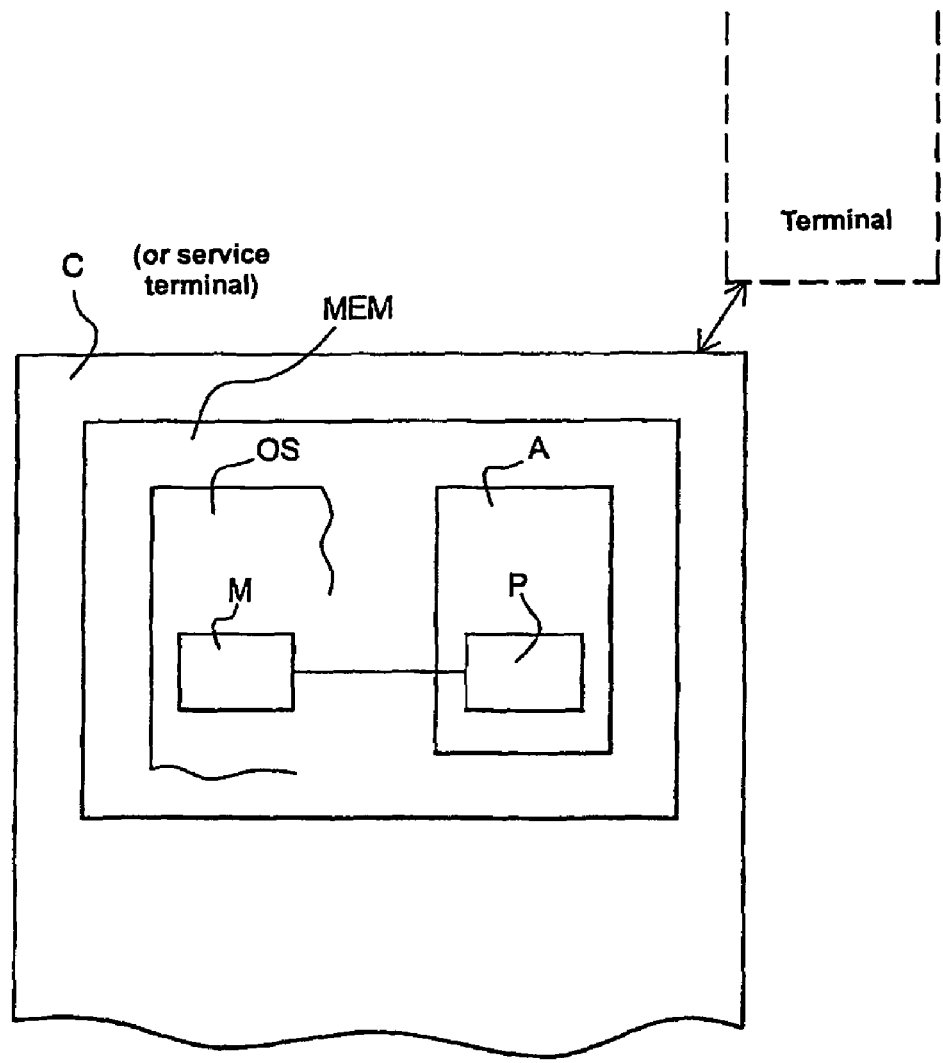
FIG. 2 depicts schematically a chip card able to implement the method according to the invention.

FIG. 2 illustrates schematically and in a simplified fashion a memory MEM of a chip card C. This memory represents the program memory or memories of a mobile telephony chip card. The memory illustrated MEM contains programs such as the operating system of the chip card and at least one application program A.

According to the invention the program of the operating system OS of the card comprises or uses a mechanism M illustrated by FIG. 1. The application A loaded in the card for its part comprises the information, that is to say the triggering parameters previously described which enable the card to know or deduce which are the network access technologies supported by the application.

In a variant execution, the testing mechanism can be located within the application itself. In this case the application is triggered and at the start of its execution the test is implemented. If the test reveals that the application is compatible with the current access then the execution continues, otherwise the execution stops.

APPENDIX 1

Data Structure of the «INSTALL» Command

| M/O | LENGTH | DESCRIPTION[1] | | | | | |
|---|---|---|---|---|---|---|---|
| M | 1 | Load file AID length | | | | | |
| M | 5 to 16 | Load file AID field | | | | | |
| M | 1 | Applet Class AID length | | | | | |
| M | 5 to 16 | Applet Class AID | | | | | |
| M | 1 | Instance AID length | | | | | |
| M | 5 to 16 | Instance AID field | | | | | |
| O | 1 | Privilege length | | | | | |
| O | 0 or 1 | Privilege field | | | | | |
| M | 1 | Install Parameter Length | | | | | |
| O | ≧14 | Install Parameter field in TLV format: | | | | | |
| | | M/O | LENGTH | DESCRIPTION | | | |
| | | O | 1 | Tag of System specific parameters field (= EFh) | | | |
| | | O | 1 | System specific parameters length | | | |
| | | O | ≧10 | System specific parameters field in TLV format: | | | |
| | | | | M/O | LENGTH | DESCRIPTION | |
| | | | | O | 1 | Tag C8h | |
| | | | | O | 1 | Length of next field | |
| | | | | O | 2 | Non-volatile install memory size | |
| | | | | O | 1 | Tag C7h | |
| | | | | O | 1 | Length of next field | |
| | | | | O | 2 | Volatile install memory size | |
| | | | | O | 1 | Tag Cah | |
| | | | | O | 1 | Length of next field | |
| | | | | O | 0 or 6 + 2n | GSM applet specific parameters | |
| | | O | 1 | Tag C9h | | | |
| | | O | 1 | Length of next field | | | |
| | | O | 0 to 32 | Application specific parameters field (unformatted) | | | |
| | | O | 1 | Tag CBh | | | |
| | | O | 1 | Length of next field: 4 | | | |
| | | O | 4 | Selective Triggering parameters | | | |
| M | 1 | Length of next field (Not Checked) | | | | | |
| O | 0 | Reserved for Install token field (delegation not supported) | | | | | |

APPENDIX 2

«PUT DATA» Command

| FIELD | DESCRIPTION-VALUE |
|---|---|
| CLA | 80h or 84h |
| INS | Dah |
| P1 | Data Object Tag Parameter '00h' |
| P2 | Data Object Tag Parameter 'C2h' |
| Lc | Data Length plus Put Data Token Length (if present) and MAC Length (if present) |
| Data field | Data, Put Data Token (if present), and MAC (if present) |

DATA Command for TAG 00C2h

| Length | Description |
|---|---|
| 1 | AID Tag: '4Fh' |
| 1 | AID Data Length: '05h-10h' |
| 5-16 | Application AID Data: 'XX . . . ' |
| 1 | Selective Triggering Parameter Tag: 'CBh' |
| 1 | Selective Triggering Parameter Length: '04h' |
| 4 | Selective Triggering Parameter Data: 'XXXXXXXX' |

«GET DATA» Command

| FIELD | DESCRIPTION-VALUE |
|---|---|
| CLA | 80h or 84h |
| INS | Cah |
| P1 | Data Object Tag Parameter: '00h' |
| P2 | Data Object Tag Parameter: 'C2h' |
| Lc | Data Length plus MAC Length (if present) |
| Data field | Data and MAC (if present) |

DATA Command for TAG 00Ch2

| Length | Description |
|---|---|
| 1 | AID Tag: '4Fh' |
| 1 | AID Data Length: '05h-10h' |
| 5-16 | Application AID Data: 'XX . . . ' |
| 1 | Selective Triggering Parameter Tag: 'XX' (not analyzed) |
| 1 | Selective Triggering Parameter Length: 'XX' (not analyzed) |
| 4 | Selective Triggering Parameter Data: 'XXXXXXXX' (not analyzed) |

APPENDIX 3

DATA Response for TAG 00C2h

| Length | Description |
|---|---|
| 1 | AID Tag: '4Fh' |
| 1 | AID Data Length: '05h-10h' |
| 5-16 | Application AID Data: 'XX . . . ' |
| 1 | Selective Triggering Parameter Tag: 'CBh' |
| 1 | Selective Triggering Parameter Length: '04h' |
| 4 | Selective Triggering Parameter Data: 'XXXXXXXX' |

«GET STATUS» Command

| Length | Value | Meaning |
|---|---|---|
| 1 | 'xx' | Length of AID |
| 1-n | 'xxxx . . . ' | AID |
| 1 | 'xx' | Life Cycle State |
| 1 | 'xx' | Application Privileges |
| 4 | 'xxxxxxxx' | Selective Triggering Parameters |

The invention claimed is:

1. A method of managing the triggering of applications in a terminal placed in an environment composed of several access technologies, comprising the following steps:
   identifying, upon arrival of a triggering event, an application on said terminal associated with said triggering event;
   implementing a mechanism for testing the identified application; and
   determining at least one network access technology supported by the identified and tested application using an application identifier of the identified and tested application, wherein
   the mechanism comprises four operating modes, a first of which being based on characteristics of the application, a second of which being based on the application identifier of the application, a third of which being based on attributes of the application, and a fourth of which being taken by default when none of the other modes is declared.

2. A method of managing the triggering of an application according to claim 1, wherein the test mechanism is in the operating system of the terminal and its implementation comprises:
   verifying, by the terminal, information concerning a current network access technology or technologies, and information contained in the application enabling it to determine the technology or technologies supported by the application; and
   triggering of the application solely in the case where the verified information is compatible.

3. A method of managing the triggering of an application according to claim 2, wherein the information contained in the application comprises triggering parameters from one of the four operating modes, making it possible to determine network access technology or technologies supported by the application.

4. A method of managing the triggering of an application according to claim 2, further including the step of enabling said mechanism to install a new application containing the information making it possible to determine the technology or technologies supported by said application, or to update said information or to read said information.

5. A method of managing the triggering of an application, according to claim 1, wherein the test mechanism is in the application and its implementation comprises:
   verifying, by the terminal, information concerning a current network access technology or technologies, and information contained in the application enabling it to determine the technology or technologies supported by the application; and continuing execution of the application solely in the case where the verified information is compatible.

6. A method of managing the triggering of an application according to claim 5, wherein the information contained in the application comprises triggering parameters from one of the four operating modes, making it possible to determine network access technology or technologies supported by the application.

7. A method of managing the triggering of an application according to claim 5, further including the step of enabling said mechanism to install a new application containing the information making it possible to determine the technology or technologies supported by said application, or to update said information or to read said information.

8. A method of managing the triggering of an application according to claim 1, wherein information contained in the application comprises triggering parameters from one of the four operating modes, making it possible to determine network access technology or technologies supported by the application.

9. A method of managing the triggering of an application according to claim 8, further including the step of enabling said mechanism to install a new application containing the information making it possible to determine the technology or technologies supported by said application, or to update said information or to read said information.

10. A method of managing the triggering of an application according to claim 8, further including the step of enabling said mechanism to install a new application containing the information making it possible to determine the technology or technologies supported by said application, or to update said information or to read said information.

11. A method of managing the triggering of an application according to claim 1, wherein several operating modes can be declared for one and the same application.

12. A method of managing the triggering of an application, according to claim 11, wherein the default mode corresponds to the case where the application is indifferent to the network access technology.

13. A method of managing the triggering of an application according to claim 11, further including the step of enabling said mechanism to install a new application containing the information making it possible to determine the technology or technologies supported by said application, or to update said information or to read said information.

14. A method of managing the triggering of an application, according to claim 1 wherein the default mode corresponds to the case where the application is indifferent to the network access technology.

15. A method of managing the triggering of an application according to claim 14, further including the step of enabling said mechanism to install a new application containing the information making it possible to determine the technology or technologies supported by said application, or to update said information or to read said information.

16. A method of managing the triggering of an application according to claim 1, further including the step of enabling said mechanism to install a new application containing the information making it possible to determine the technology or technologies supported by said application, or to update said information or to read said information.

17. The method of claim 1, further comprising the step of:
indicating in a field of the tested application, the information identifying that the network access technology or technologies supported by the tested application is determinable using the application identifier of the tested application.

18. A service terminal comprising:
program storage means for storing a program corresponding to the operating system and one or more applications,
means for identifying at least one application associated with a triggering event, and
means of implementing a method of testing the at least one identified application from information contained in the identified application, said information enabling the operating system to determine at least one network access technology supported by the identified and tested application using an application identifier of the identified and tested application and to check its compatibility with a current network access technology used by the service terminal, wherein
the method of testing comprises four operating modes, a first of which being based on characteristics of the application, a second of which being based on the application identifier of the application, a third of which being based on attributes of the application, and a fourth of which being taken by default when none of the other modes is declared.

19. A service terminal according to claim 18, wherein said service terminal is a telecommunication terminal of a mobile telephone type equipped with a chip card and able to function with a multi-technology network access environment, and wherein the application tested and the test mechanism are located in the chip card.

20. A telecommunication terminal chip card, comprising means of implementing a method of testing at least one identified application which, from information contained in the identified application tested, enables the operating system of the chip card to determine at least one network access technology supported by the identified and tested application using an application identifier of the identified and tested application and to check compatibility of the identified and tested application with a current network access technology used by a terminal of the chip card, wherein
said means comprises four operating modes, a first of which being based on characteristics of the application, a second of which being based on the application identifier of the application, a third of which being based on attributes of the application, and a fourth of which being taken by default when none of the other modes is declared.

21. A telecommunication terminal chip card according to claim 20, wherein a test mechanism implementing the method is a program loaded in a non-volatile program memory of the chip card, called up by the operating system of the chip card or integrated in said operating system.

22. An application able to be identified, tested and executed by a service terminal for a chip card in an environment composed of several network access technologies, the application being stored in memory and comprising:
triggering rules as a function of an arrival of at least one predefined event and
information, including at least an application identifier, that is used when said application is tested by a testing mechanism, said testing mechanism enabling the application to determine, by using said application identifier of the application, at least one network access technology that the application supports, wherein
the mechanism comprises four operating modes, a first of which being based on characteristics of the application, a second of which being based on the application identifier of the application, a third of which being based on attributes of the application, and a fourth of which being taken by default when none of the other modes is declared.

23. A method of managing the triggering of an application in a terminal placed in an environment composed of several access technologies, comprising the following steps:

provviding in the application a mode flag, the mode flag indicating a type of information associated with the application for determining the network access technology or technologies supported by the application;

implementing, upon arrival of an event triggering the application on said terminal, a mechanism for testing the triggered application, and determining at least one network access technology supported by the triggered and tested application based on the type of information indicated by the mode flag, wherein the mechanism comprises four operating modes, a first of which being based on characteristics of the application, a second of which being based on the application identifier of the application, a third of which being based on attributes of the application, and a fourth of which being taken by default when none of the other modes is declared.

24. The method of claim 23, wherein the determining of the network access technology or technologies includes:

establishing, based on the mode flag indicated, from the application identifier of the tested application, the network access technology or technologies supported by the tested application.

25. The method of claim 23, wherein the mode flag is based on one of characteristics of the triggered application, identification of the triggered application, attributes of the triggered application, and a default setting.

* * * * *